(12) United States Patent
Meirav et al.

(10) Patent No.: US 10,792,608 B2
(45) Date of Patent: Oct. 6, 2020

(54) SCRUBBER FOR HVAC SYSTEM

(71) Applicant: enVerid Systems, Inc., Needham, MA (US)

(72) Inventors: Udi Meirav, Newton, MA (US); Israel Biran, Avihayil (IL)

(73) Assignee: enverid systems, inc., Westwood, MA (US)

( * ) Notice: Subject to any disclaimer, the term of this patent is extended or adjusted under 35 U.S.C. 154(b) by 271 days.

(21) Appl. No.: 15/754,917

(22) PCT Filed: Aug. 24, 2016

(86) PCT No.: PCT/US2016/048439
§ 371 (c)(1),
(2) Date: Feb. 23, 2018

(87) PCT Pub. No.: WO2017/035254
PCT Pub. Date: Mar. 2, 2017

(65) Prior Publication Data
US 2018/0236396 A1  Aug. 23, 2018

Related U.S. Application Data

(60) Provisional application No. 62/208,822, filed on Aug. 24, 2015.

(51) Int. Cl.
*B01D 53/04* (2006.01)
*F24F 3/16* (2006.01)
(Continued)

(52) U.S. Cl.
CPC ..... *B01D 53/0446* (2013.01); *B01D 53/0415* (2013.01); *B01D 53/0438* (2013.01);
(Continued)

(58) Field of Classification Search
CPC ........... B01D 53/0415; B01D 53/0438; B01D 53/0446; B01D 53/0454; B01D 53/0462;
(Continued)

(56) References Cited

U.S. PATENT DOCUMENTS

| | | |
|---|---|---|
| 1,522,480 A | 1/1925 | Allen |
| 1,836,301 A | 12/1931 | Bechthold |

(Continued)

FOREIGN PATENT DOCUMENTS

| | | |
|---|---|---|
| CA | 2 640 152 A1 | 4/2010 |
| CN | 2141873 Y | 9/1993 |

(Continued)

OTHER PUBLICATIONS

International Search Report and Written Opinion for International Application No. PCT/US2016/048439, dated Nov. 16, 2016.

(Continued)

*Primary Examiner* — Frank M Lawrence, Jr.
(74) *Attorney, Agent, or Firm* — Cooley LLP

(57) ABSTRACT

In some embodiments, there is provided a scrubber system for cleaning return air in an HVAC unit, where the scrubber system attaches directly to an inlet of the return-air side of the HVAC unit, for example, by the mating of a flange on the system with a matching flange on the HVAC unit. The bolt-on scrubber system may comprise one or more sorbent materials, a fan for circulating return air through the sorbent, a damper-controlled inlet and a damper-controlled outlet to the attached return air side of the HVAC unit. Further, an additional air flow channel and a damper may be included in the system to control the flow of outside air into the HVAC unit. In some embodiments, the sorbents may be contained in removable inserts.

20 Claims, 1 Drawing Sheet

(51) Int. Cl.
*F24F 7/08* (2006.01)
*F24F 3/044* (2006.01)

(52) U.S. Cl.
CPC ..... *B01D 53/0454* (2013.01); *B01D 53/0462* (2013.01); *F24F 3/044* (2013.01); *F24F 3/16* (2013.01); *F24F 3/1603* (2013.01); *F24F 7/08* (2013.01); *B01D 2253/102* (2013.01); *B01D 2253/104* (2013.01); *B01D 2253/106* (2013.01); *B01D 2253/108* (2013.01); *B01D 2253/11* (2013.01); *B01D 2253/1124* (2013.01); *B01D 2253/202* (2013.01); *B01D 2253/204* (2013.01); *B01D 2257/10* (2013.01); *B01D 2257/302* (2013.01); *B01D 2257/404* (2013.01); *B01D 2257/502* (2013.01); *B01D 2257/504* (2013.01); *B01D 2257/708* (2013.01); *B01D 2259/4508* (2013.01); *F24F 2003/1621* (2013.01); *F24F 2003/1625* (2013.01); *F24F 2003/1639* (2013.01); *Y02C 10/08* (2013.01)

(58) Field of Classification Search
CPC ........ B01D 2253/102; B01D 2253/104; B01D 2253/106; B01D 2253/108; B01D 2253/11; B01D 2253/1124; B01D 2253/203; B01D 2253/204; B01D 2257/10; B01D 2257/302; B01D 2257/404; B01D 2257/502; B01D 2257/504; B01D 2257/708; B01D 2259/4508; F24F 3/044; F24F 3/16; F24F 3/1603; F24F 7/08; F24F 2003/1621; F24F 2003/1625; F24F 2003/1639; Y02C 10/08
USPC ......... 96/111, 134, 138, 139, 140, 141, 142, 96/143, 146, 147, 151
See application file for complete search history.

(56) References Cited

U.S. PATENT DOCUMENTS

| | | | |
|---|---|---|---|
| 2,633,928 | A * | 4/1953 | Chamberlain ........ F26B 21/083 96/111 |
| 3,042,497 | A | 7/1962 | Johnson et al. |
| 3,107,641 | A | 10/1963 | Haynes |
| 3,344,050 | A | 9/1967 | Mayland et al. |
| 3,511,595 | A | 5/1970 | Fuchs |
| 3,594,983 | A | 7/1971 | Yearout |
| 3,619,130 | A | 11/1971 | Ventriglio et al. |
| 3,702,049 | A | 11/1972 | Morris, Jr. |
| 3,751,848 | A | 8/1973 | Ahlstrand |
| 3,751,878 | A | 8/1973 | Collins |
| 3,795,090 | A * | 3/1974 | Barnebey ................ B01D 46/30 96/150 |
| 3,808,773 | A | 5/1974 | Reyhing et al. |
| 3,885,927 | A | 5/1975 | Sherman et al. |
| 3,885,928 | A | 5/1975 | Wu |
| 4,182,743 | A | 1/1980 | Rainer et al. |
| 4,228,197 | A | 10/1980 | Means |
| 4,249,915 | A | 2/1981 | Sirkar et al. |
| 4,292,059 | A | 9/1981 | Kovach |
| 4,322,394 | A | 3/1982 | Mezey et al. |
| 4,325,921 | A | 4/1982 | Aiken et al. |
| 4,409,006 | A | 10/1983 | Mattia |
| 4,433,981 | A | 2/1984 | Slaugh et al. |
| 4,451,435 | A | 5/1984 | Hölter et al. |
| 4,472,178 | A | 9/1984 | Kumar et al. |
| 4,530,817 | A | 7/1985 | Hölter et al. |
| 4,551,304 | A | 11/1985 | Holter et al. |
| 4,559,066 | A | 12/1985 | Hunter et al. |
| 4,711,645 | A | 12/1987 | Kumar et al. |
| 4,810,266 | A | 3/1989 | Zinnen et al. |
| 4,816,043 | A | 3/1989 | Harrison |
| 4,863,494 | A | 9/1989 | Hayes |
| 4,892,719 | A | 1/1990 | Gesser |
| 4,917,862 | A | 4/1990 | Kraw et al. |
| 4,976,749 | A * | 12/1990 | Adamski ................ B03C 3/155 55/354 |
| 4,987,952 | A | 1/1991 | Beal et al. |
| 5,046,319 | A | 9/1991 | Jones |
| 5,087,597 | A | 2/1992 | Leal et al. |
| 5,109,916 | A | 5/1992 | Thompson |
| 5,137,548 | A | 8/1992 | Grenier et al. |
| 5,149,343 | A | 9/1992 | Sowinski |
| 5,186,903 | A | 2/1993 | Cornwell |
| 5,194,158 | A | 3/1993 | Matson |
| 5,221,520 | A | 6/1993 | Cornwell |
| 5,231,063 | A | 7/1993 | Fukumoto et al. |
| 5,281,254 | A | 1/1994 | Birbara et al. |
| 5,290,345 | A | 3/1994 | Osendorf et al. |
| 5,292,280 | A | 3/1994 | Janu et al. |
| 5,322,473 | A | 6/1994 | Hofstra et al. |
| 5,352,274 | A | 10/1994 | Blakley |
| 5,376,614 | A | 12/1994 | Birbara et al. |
| 5,389,120 | A | 2/1995 | Sewell et al. |
| 5,407,465 | A | 4/1995 | Schaub et al. |
| 5,443,625 | A * | 8/1995 | Schaffhausen ..... B01D 46/0005 95/113 |
| 5,464,369 | A | 11/1995 | Federspiel |
| 5,471,852 | A * | 12/1995 | Meckler ............... B01D 53/261 62/271 |
| 5,492,683 | A | 2/1996 | Birbara et al. |
| 5,584,916 | A | 12/1996 | Yamashita et al. |
| 5,614,000 | A | 3/1997 | Kalbassi et al. |
| 5,646,304 | A | 7/1997 | Acharya et al. |
| 5,672,196 | A | 9/1997 | Acharya et al. |
| 5,675,979 | A | 10/1997 | Shah |
| 5,702,505 | A | 12/1997 | Izumi et al. |
| 5,707,005 | A | 1/1998 | Kettler et al. |
| 5,827,355 | A | 10/1998 | Wilson |
| 5,869,323 | A | 2/1999 | Horn |
| 5,876,488 | A | 3/1999 | Birbara et al. |
| 5,904,896 | A | 5/1999 | High |
| 5,948,355 | A | 9/1999 | Fujishima et al. |
| 5,964,927 | A | 10/1999 | Graham et al. |
| 5,984,198 | A | 11/1999 | Bennett et al. |
| 6,024,781 | A | 2/2000 | Bülow et al. |
| 6,027,550 | A | 2/2000 | Vickery |
| 6,102,793 | A | 8/2000 | Hansen |
| 6,113,674 | A | 9/2000 | Graham et al. |
| 6,120,581 | A | 9/2000 | Markovs et al. |
| 6,123,617 | A | 9/2000 | Johnson |
| 6,187,596 | B1 | 2/2001 | Dallas et al. |
| 6,254,763 | B1 | 7/2001 | Izumi et al. |
| 6,280,691 | B1 | 8/2001 | Homeyer et al. |
| 6,364,938 | B1 | 4/2002 | Birbara et al. |
| 6,375,722 | B1 | 4/2002 | Henderson et al. |
| 6,402,809 | B1 | 6/2002 | Monereau et al. |
| 6,428,608 | B1 | 8/2002 | Shah et al. |
| 6,432,367 | B1 | 8/2002 | Munk |
| 6,432,376 | B1 | 8/2002 | Choudhary et al. |
| 6,533,847 | B2 | 3/2003 | Seguin et al. |
| 6,547,854 | B1 | 4/2003 | Gray et al. |
| 6,605,132 | B2 | 8/2003 | Fielding |
| 6,623,550 | B2 | 9/2003 | Dipak et al. |
| 6,711,470 | B1 | 3/2004 | Hartenstein et al. |
| 6,726,558 | B1 | 4/2004 | Meirav |
| 6,773,477 | B2 | 8/2004 | Lindsay |
| 6,796,896 | B2 | 9/2004 | Laiti |
| 6,797,246 | B2 | 9/2004 | Hopkins |
| 6,866,701 | B2 | 3/2005 | Meirav |
| 6,908,497 | B1 | 6/2005 | Sirwardane |
| 6,916,239 | B2 | 7/2005 | Siddaramanna et al. |
| 6,916,360 | B2 | 7/2005 | Seguin et al. |
| 6,930,193 | B2 | 8/2005 | Yaghi et al. |
| 6,964,692 | B2 | 11/2005 | Gittleman et al. |
| 6,974,496 | B2 | 12/2005 | Wegeng et al. |
| 7,288,136 | B1 | 10/2007 | Gray et al. |
| 7,407,533 | B2 | 8/2008 | Steins |
| 7,407,633 | B2 | 8/2008 | Potember et al. |
| 7,449,053 | B2 | 11/2008 | Hallam |

(56) References Cited

U.S. PATENT DOCUMENTS

| | | | |
|---|---|---|---|
| 7,472,554 B2 | 1/2009 | Vosburgh | |
| 7,645,323 B2 | 1/2010 | Massenbauer-Strafe et al. | |
| 7,662,746 B2 | 2/2010 | Yaghi et al. | |
| 7,666,077 B1 | 2/2010 | Thelen | |
| 7,802,443 B2 | 9/2010 | Wetzel | |
| 7,846,237 B2 | 12/2010 | Wright et al. | |
| 7,891,573 B2 | 2/2011 | Finkam et al. | |
| 8,157,892 B2 | 4/2012 | Meirav | |
| 8,210,914 B2 | 7/2012 | McMahan et al. | |
| 8,317,890 B2 | 11/2012 | Raether et al. | |
| 8,398,753 B2 | 3/2013 | Sergi et al. | |
| 8,491,710 B2 | 7/2013 | Meirav | |
| 8,690,999 B2 | 4/2014 | Meirav et al. | |
| 8,734,571 B2 | 5/2014 | Golden et al. | |
| 9,316,410 B2 | 4/2016 | Meirav et al. | |
| 9,328,936 B2 | 5/2016 | Meirav et al. | |
| 9,399,187 B2 | 7/2016 | Meirav et al. | |
| 9,566,545 B2 | 2/2017 | Meirav et al. | |
| 9,802,148 B2 | 10/2017 | Meirav et al. | |
| 9,919,257 B2 | 3/2018 | Meirav et al. | |
| 9,939,163 B2 | 4/2018 | Meirav et al. | |
| 9,950,290 B2 | 4/2018 | Meirav et al. | |
| 9,976,760 B2 | 5/2018 | Meirav et al. | |
| 9,987,584 B2 | 6/2018 | Meirav et al. | |
| 10,046,266 B2 | 8/2018 | Meirav et al. | |
| 10,086,324 B2 | 10/2018 | Meirav | |
| 10,281,168 B2 | 5/2019 | Meirav et al. | |
| 10,525,401 B2 | 1/2020 | Meirav et al. | |
| 2001/0021363 A1 | 9/2001 | Poles et al. | |
| 2001/0054415 A1 | 12/2001 | Hanai et al. | |
| 2002/0056373 A1 | 5/2002 | Fielding | |
| 2002/0078828 A1 | 6/2002 | Kishkovich et al. | |
| 2002/0083833 A1 | 7/2002 | Nalette et al. | |
| 2002/0147109 A1 | 10/2002 | Branover et al. | |
| 2002/0183201 A1 | 12/2002 | Barnwell et al. | |
| 2002/0193064 A1 | 12/2002 | Michalakos et al. | |
| 2003/0037672 A1 | 2/2003 | Sircar | |
| 2003/0041733 A1 | 3/2003 | Sequin et al. | |
| 2003/0097086 A1 | 5/2003 | Gura | |
| 2003/0188745 A1 | 10/2003 | Deas et al. | |
| 2004/0005252 A1 | 1/2004 | Siess | |
| 2004/0020361 A1 | 2/2004 | Pellegrin | |
| 2004/0069144 A1 | 4/2004 | Wegeng et al. | |
| 2004/0118287 A1 | 6/2004 | Jaffe et al. | |
| 2005/0133196 A1 | 6/2005 | Gagnon et al. | |
| 2005/0147530 A1 | 7/2005 | Kang et al. | |
| 2005/0191219 A1 | 9/2005 | Uslenghi et al. | |
| 2005/0262869 A1 | 12/2005 | Tongu et al. | |
| 2005/0284291 A1 | 12/2005 | Alizadeh-Khiavi et al. | |
| 2005/0288512 A1 | 12/2005 | Butters et al. | |
| 2006/0032241 A1 | 2/2006 | Gontcharov et al. | |
| 2006/0054023 A1 | 3/2006 | Raetz et al. | |
| 2006/0079172 A1 | 4/2006 | Fleming et al. | |
| 2006/0112708 A1 | 6/2006 | Reaves | |
| 2006/0148642 A1 | 7/2006 | Ryu et al. | |
| 2006/0225569 A1 | 10/2006 | Schmidt et al. | |
| 2006/0236867 A1* | 10/2006 | Neary | B01D 53/0415 96/121 |
| 2006/0249019 A1 | 11/2006 | Roychoudhury et al. | |
| 2008/0119356 A1 | 3/2008 | Ryu et al. | |
| 2008/0078289 A1 | 4/2008 | Sergi et al. | |
| 2008/0127821 A1 | 6/2008 | Noack et al. | |
| 2008/0135060 A1 | 6/2008 | Kuo et al. | |
| 2008/0173035 A1 | 7/2008 | Thayer et al. | |
| 2008/0182506 A1 | 7/2008 | Jackson et al. | |
| 2008/0210768 A1 | 9/2008 | You | |
| 2008/0216653 A1 | 9/2008 | Paton-Ash et al. | |
| 2008/0293976 A1 | 11/2008 | Olah et al. | |
| 2009/0000621 A1 | 1/2009 | Haggblom et al. | |
| 2009/0044704 A1* | 2/2009 | Shen | B01D 53/0454 96/130 |
| 2009/0071062 A1 | 3/2009 | Hedman | |
| 2009/0120288 A1 | 5/2009 | Lackner et al. | |
| 2009/0188985 A1 | 7/2009 | Scharing et al. | |
| 2009/0220388 A1 | 9/2009 | Monzyk et al. | |
| 2009/0260372 A1 | 10/2009 | Skinner et al. | |
| 2010/0076605 A1 | 3/2010 | Harrod et al. | |
| 2010/0154636 A1 | 6/2010 | Liu et al. | |
| 2010/0224565 A1 | 9/2010 | Dunne et al. | |
| 2010/0254868 A1 | 10/2010 | Obee et al. | |
| 2010/0262298 A1 | 10/2010 | Johnson et al. | |
| 2010/0275775 A1 | 11/2010 | Griffiths et al. | |
| 2010/0278711 A1 | 11/2010 | Find | |
| 2011/0064607 A1 | 3/2011 | Hedman | |
| 2011/0079143 A1 | 4/2011 | Marotta et al. | |
| 2011/0085933 A1 | 4/2011 | Mazyek et al. | |
| 2011/0146494 A1 | 6/2011 | Desai et al. | |
| 2011/0179948 A1 | 7/2011 | Choi et al. | |
| 2011/0189075 A1 | 8/2011 | Wright et al. | |
| 2011/0192172 A1 | 8/2011 | Delacruz | |
| 2011/0206572 A1 | 8/2011 | McKenna et al. | |
| 2011/0250121 A1 | 10/2011 | Schmidt | |
| 2011/0262327 A1 | 10/2011 | Dillon et al. | |
| 2011/0269919 A1 | 11/2011 | Min et al. | |
| 2011/0277490 A1 | 11/2011 | Meirav | |
| 2011/0296872 A1 | 12/2011 | Eisenberger | |
| 2012/0004092 A1 | 1/2012 | Raatschen et al. | |
| 2012/0012005 A1 | 1/2012 | Burke | |
| 2012/0052786 A1 | 3/2012 | Clawsey | |
| 2012/0076711 A1 | 3/2012 | Gebald et al. | |
| 2012/0129267 A1 | 5/2012 | Daly | |
| 2012/0137876 A1 | 6/2012 | Miller | |
| 2012/0148858 A1 | 6/2012 | Wu | |
| 2012/0152116 A1 | 6/2012 | Barclay et al. | |
| 2012/0168113 A1 | 7/2012 | Karamanos | |
| 2012/0216676 A1 | 8/2012 | Addiego et al. | |
| 2012/0222500 A1 | 9/2012 | Riess et al. | |
| 2012/0271460 A1 | 10/2012 | Rognili | |
| 2012/0272966 A1 | 11/2012 | Ando et al. | |
| 2012/0311926 A1 | 12/2012 | Mittelmark | |
| 2012/0321511 A1 | 12/2012 | Lorcheim | |
| 2013/0052113 A1 | 2/2013 | Molins et al. | |
| 2013/0291732 A1 | 11/2013 | Meirav | |
| 2013/0331021 A1 | 12/2013 | Rodell | |
| 2014/0013956 A1* | 1/2014 | Ericson | B01D 53/261 96/118 |
| 2014/0020559 A1* | 1/2014 | Meirav | B01D 53/0438 95/148 |
| 2014/0242708 A1 | 8/2014 | Lundgren | |
| 2014/0298996 A1 | 10/2014 | Meirav et al. | |
| 2014/0326428 A1 | 11/2014 | Meirav et al. | |
| 2015/0078964 A1 | 3/2015 | Meirav et al. | |
| 2015/0297771 A1 | 10/2015 | Law et al. | |
| 2016/0271556 A1 | 9/2016 | Okano | |
| 2016/0363333 A1 | 12/2016 | Meirav et al. | |
| 2017/0227241 A1* | 8/2017 | Claesson | B01D 53/26 |
| 2018/0147526 A1 | 5/2018 | Meirav et al. | |
| 2018/0187907 A1 | 7/2018 | Meirav et al. | |
| 2018/0207574 A1 | 7/2018 | Meirav et al. | |
| 2018/0264396 A1 | 9/2018 | Meirav et al. | |
| 2018/0339261 A1 | 11/2018 | Meirav et al. | |
| 2018/0339262 A1 | 11/2018 | Perl-Olshvang et al. | |
| 2019/0143258 A1 | 5/2019 | Meirav et al. | |
| 2019/0186762 A1 | 6/2019 | Meirav et al. | |
| 2019/0247782 A1 | 8/2019 | Meirav et al. | |
| 2019/0262761 A1 | 8/2019 | Meirav | |
| 2019/0299154 A1 | 10/2019 | Meirav et al. | |
| 2019/0344211 A1 | 11/2019 | Meirav et al. | |
| 2019/0346161 A1 | 11/2019 | Meirav et al. | |

FOREIGN PATENT DOCUMENTS

| | | |
|---|---|---|
| CN | 2612444 Y | 4/2004 |
| CN | 2729562 Y | 9/2005 |
| CN | 1872388 A | 12/2006 |
| CN | 101001767 A | 7/2007 |
| CN | 101072620 A | 11/2007 |
| CN | 200993448 Y | 12/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 201618493 U | 11/2010 |

(56) References Cited

FOREIGN PATENT DOCUMENTS

| | | |
|---|---|---|
| CN | 102233217 A | 11/2011 |
| CN | 202032686 U | 11/2011 |
| CN | 202270445 U | 6/2012 |
| CN | 103119376 A | 5/2013 |
| DE | 102006048716 B3 | 2/2008 |
| EP | 0 475 493 A2 | 3/1992 |
| EP | 2 465 596 A1 | 6/2012 |
| ES | 2 387 791 A1 | 10/2012 |
| JP | 56-158126 A | 12/1981 |
| JP | 59-225232 A | 12/1984 |
| JP | 60-194243 A | 10/1985 |
| JP | 02-092373 A | 4/1990 |
| JP | 03-207936 A | 9/1991 |
| JP | 05-161843 A | 6/1993 |
| JP | 06-031132 A | 2/1994 |
| JP | 08-114335 A | 5/1996 |
| JP | 09-085043 A | 3/1997 |
| JP | 2000-291978 A | 10/2000 |
| JP | 2001-170435 A | 6/2001 |
| JP | 2001-232127 A | 8/2001 |
| JP | 3207936 B2 | 9/2001 |
| JP | 2004-150778 A | 5/2004 |
| JP | 2005-090941 A | 4/2005 |
| JP | 2006-275487 A | 10/2006 |
| JP | 2009-150623 A | 7/2009 |
| JP | 2009-202137 A | 9/2009 |
| JP | 2010-149086 A | 7/2010 |
| JP | 2015-148227 A | 8/2015 |
| WO | WO 88/05693 A1 | 8/1988 |
| WO | WO 02/08160 A1 | 1/2002 |
| WO | WO 02/12796 A2 | 2/2002 |
| WO | WO 2006/016345 A1 | 2/2006 |
| WO | WO 2007/128584 A1 | 11/2007 |
| WO | WO 2008/155543 A2 | 12/2008 |
| WO | WO 2009/126607 A2 | 10/2009 |
| WO | WO 2010/091831 A1 | 8/2010 |
| WO | WO 2010/124388 A1 | 11/2010 |
| WO | WO 2011/114168 A1 | 9/2011 |
| WO | WO 2011/146478 A1 | 11/2011 |
| WO | WO 2012/071475 A1 | 5/2012 |
| WO | WO 2012/100149 A1 | 7/2012 |
| WO | WO 2012/120173 A1 | 9/2012 |
| WO | WO 2012/134415 A1 | 10/2012 |
| WO | WO 2012/145303 A2 | 10/2012 |
| WO | WO 2012/152930 A1 | 11/2012 |
| WO | WO 2012/158911 A2 | 11/2012 |
| WO | WO 2013/012622 A1 | 1/2013 |
| WO | WO 2013/074973 A1 | 5/2013 |
| WO | WO 2013/106573 A1 | 7/2013 |
| WO | WO 2014/015138 A2 | 1/2014 |
| WO | WO 2014/047632 A1 | 3/2014 |
| WO | WO 2014/078708 A1 | 5/2014 |
| WO | WO 2014/153333 A1 | 9/2014 |
| WO | WO 2014/176319 A1 | 10/2014 |
| WO | WO 2015/042150 A1 | 3/2015 |
| WO | WO 2015/123454 A1 | 8/2015 |
| WO | WO 2017/019628 A1 | 2/2017 |

OTHER PUBLICATIONS

ASHRAE. ANSI/ASHRAE Standard 62.1-2013 Ventilation for Acceptable Indoor Air Quality. American Society of Heating, Refrigerating and Air-Conditioning Engineers, Inc., Atlanta, GA; 2013, 58 pages.
Bennett, D. et al. (Oct. 2011) Indoor Environmental Quality and Heating, Ventilating, and Air Conditioning Survey of Small and Medium Size Commercial Buildings: Field Study. California Energy Commission. CEC-500-2011-043, 233 pages.
Gesser, H.D., "The Reduction of Indoor Formaldehyde Gas and that Emanating from Urea Formaldehyde Foam Insulation," Environmental International, 10:305-308 (1984).
Goeppert, A. et al., "Carbon Dioxide Capture from the Air Using a Polyamine Based Regenerable Solid Adsorbent," J. Am. Chem. Soc., 133:20164-20167 (2011).
Gray, M.L. et al., "Performance of immobilized tertiary amine solid sorbents for the capture of carbon dioxide," International Journal of Greenhouse Gas Control, 2:3-8 (2008).
Hodgson, A.T. and Levin, H. (Apr. 21, 2003) Volatile Organic Compounds in Indoor Air: A Review of Concentrations Measured in North America Since 1990. Report LBNL-51715. Berkeley, California: Environmental Energy Technologies Division, E.O. Lawrence Berkeley National Laboratory; 31 pages.
Hotchi, T. et al. (Jan. 2006) "Indoor Air Quality Impacts of a Peak Load Shedding Strategy for a Large Retail Building" Report LBNL-59293. Berkeley, California: Environmental Energy Technologies Division, E.O. Lawrence Berkeley National Laboratory; 17 pages.
Jones, C.W., "CO2 Capture from Dilute Gases as a Component of Modern Global Carbon Management," Annu. Rev. Chem. Biomol. Eng., 2:31-52 (2011).
Kang, D-H. et al. (Jun. 14, 2007) "Measurements of VOCs emission rate from building materials during bakeout with passive sampling methods" Clima 2007 WellBeing Indoors, REHVA World Congress, Jun. 10-14, 2007, Helsinki, Finland. O. Seppänen and J. Säteri (Eds.) FINVAC [online]. Retrieved from: http://www.inive.org/members_area/medias/pdf/Inive%5Cclima2007%5CA12%5CA12C1334.pdf, 6 pages.
Ma, C. et al., "Removal of low-concentration formaldehyde in air by adsorption on activated carbon modified by hexamethylene diamine," Carbon, 49:2873-2875 (2011).
Nuckols, M. L. et al., Technical Manual: Design Guidelines for Carbon Dioxide Scrubbers. Naval Coastal Systems Center, NCSC Tech Man 4110, Revision A, Jul. 1985, 10 pages.
Offerman, F.J. et al. (1991) "A Pilot Study to Measure Indoor Concentrations and Emmission Rates of Polycyclic Aromatic Hydrocarbons" Indoor Air, 4:497-512.
Serna-Guerrero, R. et al., "Triamine-grafted pore-expanded mesoporous silica for CO2 capture: Effect of moisture and adsorbent regeneration strategies," Adsorption, 16:567-575 (2010).
Sidheswaran, M.A. et al., "Energy efficient indoor VOC air cleaning with activated carbon filter (ACF) filters," Building and Environment, 47:357-367 (2012).
United States Environmental Protection Agency, "Carbon Adsorption for Control of VOC Emissions: Theory and Full Scale System Performance", EPA-450/3-88-012, Jun. 1988, 84 pages.
United States Environmental Protection Agency, "EPA Ventilation and Air Quality in Offices, Fact Sheet" Air and Radiation (6609J), 402-F-94-003, Revised Jul. 1990, 4 pages.
Wu, X. et al. (2011) "Volatile Organic Compounds in Small- and Medium-Sized Commercial Buildings in California. Suporting Information" Environ Sci Technol, 45(20):S1-S29 [online]. Retrieved from: https://pubs.acs.org/doi/suppl/10.1021/es202132u/suppl_file/es202132u_si_001.pdf.
ZORFLEX® ACC, 100% Activated Woven Carbon Cloth. Calgon Carbon Corporation, 2008, www.calgoncarbon.com, 2 pages.
ZORFLEX® ACC, 100% Activated Woven Carbon Cloth, Calgon Carbon Corporation, 2011, www.calgoncarbon.com, 2 pages.
International Preliminary Examination Report on Patentability for International Application No. PCT/US2016/048439, dated Feb. 27, 2018, 10 pages.

* cited by examiner

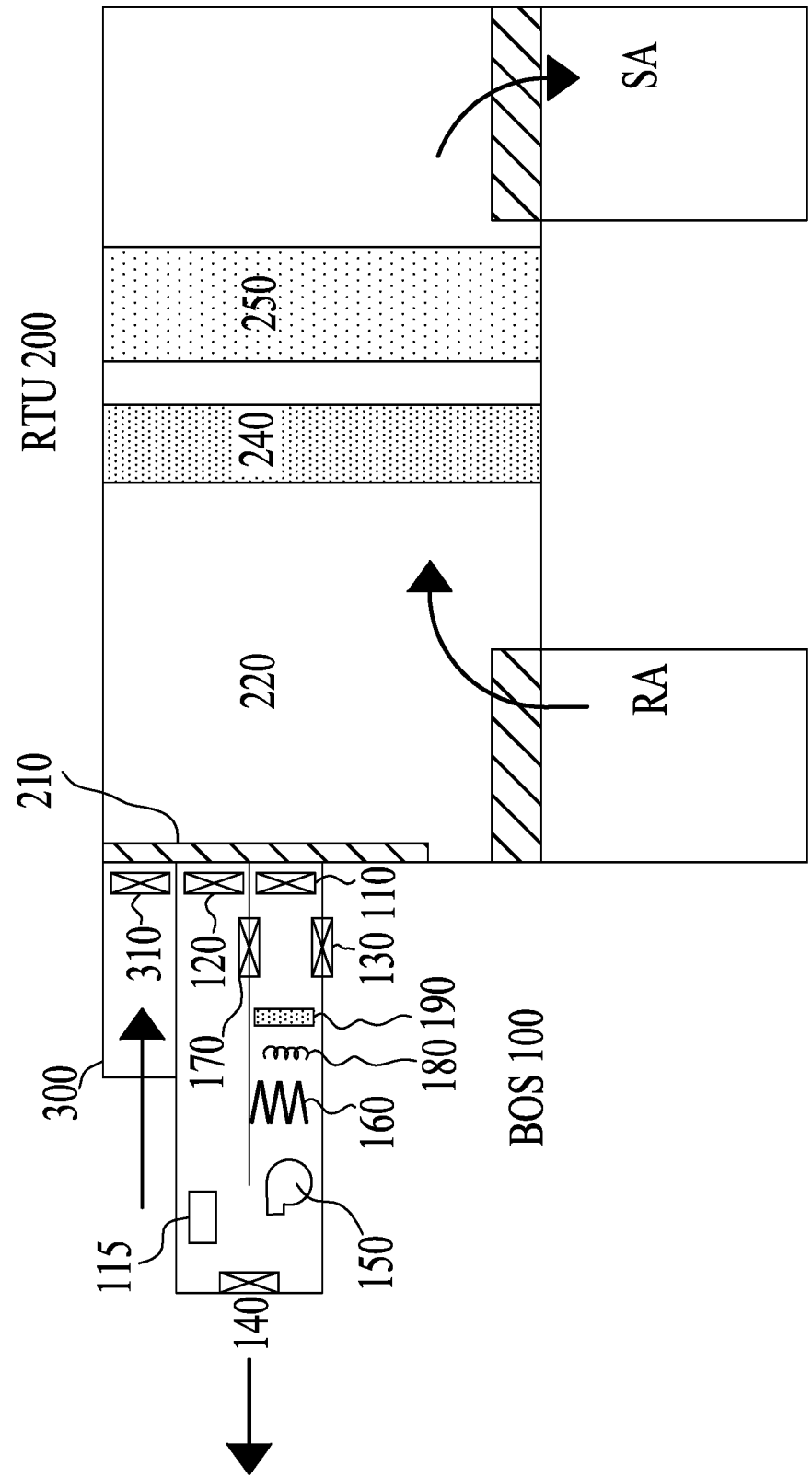

SCRUBBER FOR HVAC SYSTEM

CROSS REFERENCE TO RELATED APPLICATIONS

This application is a 35 U.S.C. § 371 national stage entry of PCT/US2016/048439, filed Aug. 24, 2016, entitled "Scrubber for HVAC System," which claims priority to U.S. Provisional Patent Application No. 62/208,822, filed Aug. 24, 2015, entitled "Bolt-On HVAC Scrubber." The disclosures of each of the above applications are which is incorporated by reference herein in their entireties.

FIELD OF THE DISCLOSURE

The present application generally relates to HVAC systems and particularly to indoor air treatment and contaminant removal therefrom.

BACKGROUND

Removal of contaminants from indoor air may be used as a means to achieving improved indoor air quality and improved economics of heating, ventilation and air conditioning (HVAC). Energy savings may be achieved as an indirect result of the contaminant removal, which enables reduced rate of air replacement. Scrubbers are a general category of air cleaning devices. Certain scrubbers utilize sorbent materials which effectuate air cleaning by selectively adsorbing certain gas species from air that comes into contact with the sorbent material. The use of regenerable sorbents in a scrubber incorporated into an air management system allows for long term operation, as a relative small amount of sorbent can be used repeatedly through a two-phase cycle of adsorption and regeneration.

SUMMARY OF SOME OF THE EMBODIMENTS

Some embodiments of the current disclosure include a scrubber assembly for scrubbing air from an enclosed environment, comprising: a housing; an interface arranged on an exterior of the housing and including a return air inlet (RAI) and a treated air outlet (TAO), and an adsorbent material configured to treat air received from the RAI. In some embodiments, the first interface is configured to mate with or otherwise couple to an external air inlet (EAI) of a heating, ventilation and air conditioning (HVAC) system; the EAI opens to a chamber of the HVAC system, through which air returned from an interior space (return air) traverses; the RAI is configured to receive at least a portion of the return air flowing via an EAI; the adsorbent material is configured to treat the at least a portion of the return air received via the RAI by adsorbing at least one contaminant contained therein, and the treated air is expelled from the scrubber assembly back to the HVAC system via the EAI.

In some embodiments, the adsorbent is regenerable, and may be configured to be regenerated in-situ. In some embodiments, the adsorbent material may be contained within a removable insert or cartridge. The assembly may further comprise one or more outside air inlets configured to receive outside air, wherein the one or more outside air inlets are further configured to receive at least a portion of the return air for use as a purging air for regenerating the regenerable adsorbent material. In some embodiments, the HVAC system includes one or more of an air handling unit (AHU) and a rooftop unit (RTU).

In some embodiments, the assembly further comprises one or more air outlets for expelling air from the scrubber assembly, wherein the one or more air outlets comprise one or more purging air outlets configured to expel air used to regenerate the absorbent material. In some embodiments, the return air from the chamber can flow directly into the scrubber assembly via the RAI without use of a conduit, and further the treated airflow may flow directly into the chamber via the TAO without us of a conduit. In some embodiments, the coupling of the interface to the EAI is facilitated via a mating of a flange of the scrubber assembly with a matching flange of the HVAC unit.

In some embodiments, the coupling of the interface to the EAI covers the EAI entirely, and wherein the scrubber assembly further comprises a pathway configured to allow flow of outside air into the chamber of the HVAC unit. In some embodiments, wherein the coupling of the interface to the EAI covers the EAI partially, the system may further comprise a separate channel configured to allow a flow of outside air into the chamber via an unobstructed portion of the EAI. In some embodiments, the coupling of the interface to the EAI may be configured to minimize a re-entrance of expelled, treated air into the scrubber assembly. In some embodiments, the coupling of the interface to the EAI can support at least a substantial portion of a weight of the assembly.

In some embodiments, the scrubber assembly can be configured as a portable unit configured for removable attachment to the HVAC system. It may further comprise a fan for circulating the return air through the adsorbent material. In some embodiments, the flow of the return air through the RAI, and/or the flow of the treated air through the TAO may be controlled by a damper. In some embodiments, the assembly may further comprise a heat source for heating at least one of a purging gas and the adsorbent material, the heat source selected from the group consisting of: a heat pump, a furnace, solar heat, an electrical coil and hot water. In addition, the assembly may contain a bypass damper configured to facilitate circulation of the heated air in the assembly through and/or over the adsorbent.

In some embodiments, the scrubber assembly may comprise one or more sensors configured to measure an amount of a contaminant in the at least a portion of the return air received via the RAI and/or the treated air expelled via the EAI. In some embodiments, the measurements can be used to control an activation and/or deactivation of the assembly.

Some embodiments of the current disclosure further include a system for cleaning air from an enclosed environment, comprising: an air handling unit (AHU) including an external air inlet (EAI), and a mixing chamber for allowing a mixing of air returned from an interior space (return air) of the enclosed environment with air entering via the EAI; and a fastened-on scrubber (BOS) assembly, the BOS assembly comprising a housing; an interface arranged on an exterior of the housing and including a return air inlet (RAI) and a treated air outlet (TAO), and an adsorbent material configured to treat air received from the RAI. In some embodiments, the interface is configured to mate with or otherwise couple to the EAI; the RAI is configured to receive the return air via the EAI, the return air having traversed through the mixing chamber; the adsorbent material is configured to treat the return air received via the RAI by adsorbing at least one contaminant contained therein, and the treated air is expelled from the scrubber assembly back to the AHU via the EAI.

In some embodiments, the coupling of the interface to the EAI may facilitate a direct flow of the mixed air into the BOS assembly. Further, the coupling of the interface to the EAI may also facilitate a direct flow of the treated into the mixing chamber of the AHU. In addition, the coupling of the interface to the EAI can support at least a portion of a weight of the BOS assembly.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows a schematic illustration of a rooftop unit (RTU) with a bolt-on scrubber (BOS) attached to the RTU's external air inlet (EAI), according to some embodiments.

DETAILED DESCRIPTION OF SOME OF THE EMBODIMENTS

In some embodiments, heating, ventilation and air conditioning (HVAC) systems may be used to treat and/or condition indoor air of an enclosed environment such as a building. For example, a HVAC system may comprise a roof-top unit (RTU), also known as a unitary system or a packaged unit. Such systems or units are usually placed outside a building, such as but not limited to the roof and the sides of the building. An RTU can refer to a complete "packaged unit" including an air handling unit (AHU) and a chiller, and/or an air handling unit receiving cold or hot fluid from a separate chiller or boiler. Throughout this disclosure, the terms "HVAC" and "RTU" may be used interchangeably to refer to a system for treating and/or conditioning air (including an AHU).

In buildings with HVAC systems in general and RTUs in particular, a scrubber may be added to the air circulation system. In some embodiments, the location of the scrubber and its interface with the indoor air circulation system can be an important determinant of the cost and performance of the added scrubber. Scrubbers may be integrated into a HVAC system, or they may be separate from but operationally coupled to the HVAC system. In buildings where the HVAC systems include outdoor RTUs, the physical installation and mechanical support of an outdoor scrubber to accompany the RTUs may be mechanically and structurally challenging, besides being cost-ineffective. For example, ducts may have to be used to connect scrubbers to RTU systems. Further, the installation and maintenance of the HVAC systems including the scrubbers may affect the structural integrity of the roof on which the HVAC system is located.

The present disclosure introduces a counter-intuitive and yet convenient and practical way to incorporate scrubbers into buildings with RTUs, by operationally coupling the scrubber (e.g., physically attaching the scrubber) to an external inlet (EAI) of the RTU. In some embodiments, the EAI may be a pre-existing outside air inlet. In some embodiments, the EAI may be an inlet of the RTU (or in general HVAC system) configured to specifically couple to the disclosed scrubber. That is, the EAI may be configured to couple to a scrubber so that the EAI provides the scrubber access to a mixing chamber of the HVAC or RTU where entering outside air and air returning from an enclosed environment mix. In such embodiments, the EAI may be the inlet that allows the outside air to enter into the mixing chamber. For example, a flange on the scrubber can be designed to mate with a flange around the EAI, and the connection may serve to support the weight and stability of the scrubber on the roof or the ground, as well as sealing the air flow pathways between the scrubber and the rooftop unit. Such a scrubber may be referred to as a bolt-on scrubber (BOS). Attaching a scrubber directly to an EI is counterintuitive because scrubbers are mainly used to treat or scrub return air (RA) returning from an enclosed environment such as a building. For example, the RA may be indoor air from a building and may contain unwanted substance that may have originated from occupants of the enclosed space, building materials, food, consumer products (e.g., cleaning products, etc.), and/or the like. Examples of such air contaminants include inorganic compounds, organic vapors, micro-organisms such as but not limited to bacteria, viruses, mold, fungi, airborne particles, etc., gases such as but not limited to carbon dioxide, carbon monoxide, sulfur oxide, nitrous oxide, radon, etc., and/or the like. Outside air (OA), which usually has less or no concentration of such contaminants, is usually not the subject of scrubbing systems. The inventors of the present disclosure have discovered that operationally coupling a BOS to an OA of a RTU provides a practical and effective system to scrub indoor air containing contaminants with little or no effect on the structural integrity of a roof.

In some embodiments, an RTU may include a mixing chamber operationally coupled to a return air inlet and an EAI of the RTU, which are configured to allow into the mixing chamber return air and outside air, respectively. In the mixing chamber, the RA may mix with the OA, in some cases diluting the concentration of the contaminants in the RA. In some embodiments, the RA inlet and/or the EAI may include dampers, valves, shutters, etc., to control the amount of OA to be mixed with the RA. The EAI may be protected by a louver or a rain cover.

In some embodiments, the coupling of the BOS to the RTU, or in general to a HVAC unit, may be in the form of a direct attachment between the BOS and the HVAC. For example, the BOS may include an interface that is configured to align with the EAI of the HVAC. In some embodiments, the BOS may include a housing and an interface arranged on an exterior surface of the housing. The interface may include a return air inlet (RAI) and a treated air outlet (TAO), and the interface may be configured to mate with or otherwise couple to an external air inlet (EAI) of the HVAC. In some embodiments, the EAI may be arranged adjacent a chamber of the HVAC system through which air returned from an interior space (return air) traverses. Further, the RAI may be configured to receive return air via the EOA, and once the return air is treated by the BOS (e.g., by an adsorbent material of the BOS, as will be discussed below), the treated air may be expelled from the TAO back to the HVAC system via the EAI.

In some embodiments, the BOS may be coupled to the EAI of the RTU such that a channel separate from the BOS may form and serve as an inlet for outside air. For example, the BOS may cover some fraction of the surface area of the RTU's EAI such that OA enters the RTU through the unobstructed portion of the RTU's EAI. The fraction may range from about 10% to almost about 100%, including values and subranges there between. In some embodiments, the BOS may cover the entire EAI of the RTU. With the addition of the bolt-on scrubber to the RTU, in some embodiments, a pathway may be used to allow OA into the mixing chamber. The OA may be utilized to maintain positive pressure in the enclosed environment that is being air-conditioned, for example, to compensate for intentional or unintentional air escaping from the building, including exhaust from bathrooms, etc. Furthermore, when outdoor temperature and humidity conditions are favorable, it may be energetically preferable to increase the amount of outside air so as to reduce the conditioning (cooling, heating, etc.) of the air to be supplied to the enclosed environment. In such embodiments, the BOS may include a pathway or channel that facilitates the introduction of OA into the RTU (via the BOS, for example). There may also be an additional separate channel (in addition to the pathway through the BOS) that facilitates the flow of OA into the RTU. The bolt on scrubber may entirely cover the EAI, and it can address the changing need for OA by having a controlled pathway for outdoor air to flow directly into the mixing chamber. The flow of OA through the unobstructed portion and/or the BOS pathway may be controlled via any suitable means such as but not limited to dampers, shutters, fans, blowers, and/or the like. For example, the amount of OA flowing through the noted pathway can be controlled by one or more dampers, and may be further assisted by a booster fan, although in general the RTU inlet has a lower pressure that the outside air.

In some embodiments, the coupling of the BOS to the EAI may be configured to facilitate the streaming of air into the BOS from the RTU. For example, the BOS may be positioned on the EAI in such a manner as to allow the BOS to receive a stream of air from the mixing chamber of the RTU. For example, the BOS may be directly attached to the EAI (e.g., an interface of the BOS including the RAI and the TAO may be directly attached or "mated" with the EAI of the HVAC or RTU). The air from the mixing chamber may be mixed air containing both OA and RA. In some embodiments, the BOS and/or the BOS's coupling to the RTU may be configured such that the mixed air that flows into the BOS contains a desired proportion of RA to OA. For example, the BOS may be coupled to the RTU such that a RA inlet of the BOS may be positioned so as to intercept a desired amount (at least approximately) of RA entering the mixing chamber. In some embodiments, the amount of RA flowing into the BOS may comprise between about 75% to about 100%, between about 85% to about 100%, between about 90% to about 100%, about 95%, etc., including values and subranges there between, of the total amount of mixed air entering the BOS. In some embodiments, ducts may be used to couple the inlets/outlets of the BOS to those of the RTU. For example, the BOS RA inlet and TAO may be coupled to the EAI of the RTU via ducts. In some embodiments, however, the couplings may be direct connections without the aid of ducts or similar equipment. For example, the BOS RA inlet and treated air outlet may be directly attached to the RTU's EAI. As will be discussed below, such coupling or mechanical attachment may also facilitate the secure placement of the BOS to that of the RTU.

In some embodiments, the BOS may also be equipped with air flow aids such as a fan, blower, etc., to urge air to flow from the mixing chamber to the BOS. The RTU may also contain a flow aid to assist in the flow of mixed air from the mixing chamber of the RTU into the BOS. In some embodiments, the RTU and/or the BOS may also be equipped with a diverter that directs the incoming (into the mixing chamber) RA to flow towards the BOS such that the mixed air entering the BOS contains a higher amount of RA (e.g., compared to OA).

In some embodiments, the coupling or mechanical attachment of the BOS to the EAI of the RTU is configured to securely place the BOS relative to the RTU and prevent its movement without separately securing it to the roof or the ground. Such a configuration is in particular useful to securely incorporate the BOS to the RTU with little or no adverse effect to the structural integrity of the roof. For example, the attachment may support some or all of the BOS's weight, thereby reducing or even eliminating the need to provide separate structural support between the BOS and the roof or ground. Further, the coupling of the BOS to the RTU's EAI can provide a direct connection to the RA stream, from which one may draw RA (which may flow into the BOS as part of a mixed RA and OA stream) to treat (e.g., filter, scrub, etc.) and reinject the treated air back into circulation. The secure coupling or mechanical/physical attachment of the BOS to the RTU allows for the formation of a single module that may be convenient for universal installation procedures of field retrofits, and less dependent on building specifics. Such modules make the retrofitting or installation procedures easier to accomplish, and also to easier teach to and train installation technicians.

In some embodiments, the BOS may comprise a BOS inlet to receive mixed RA and OA from the mixing chamber of the RTU, and a BOS treated air outlet to release air treated by the RTU back into the mixing chamber. The BOS may also include an additional purge gas inlet for receiving purge gas for use in the regeneration of the sorbent of the BOS, and an exhaust outlet for releasing exhaust purge gas containing some or all of the contaminants desorbed from the sorbent of the scrubber during regeneration. In some embodiments, the purge gas may be outside air, and/or RA diverted away from the mixing chamber. For example, there may be certain situations where one may not wish to use outside air as a purge air (e.g., when OA itself contains a high level of pollution). In such cases, some or all of the RA may be diverted towards the BOS (e.g., through the purge gas inlet) to regenerate a sorbent that may have been saturated with contaminants. In some embodiments, a combination of OA and RA may be used as purge air to regenerate the adsorbent, and the OA inlet and/or the RA inlet of the BOS can be used as an inlet to receive the purge air into the BOS.

In some embodiments, the BOS may include a heat source to heat the purge gas (OA and/or RA, for example) so as to enhance the desorption of the sorbent during the regeneration phase. In some cases, the purge air may be at the requisite temperature (e.g., when the purge air is an outside air in the summer when temperatures are elevated), and the purge air may be used to regenerate with sorbent of the scrubber without further heating. The heat source may also be used to directly heat the adsorbents. Examples of a heat source that can be used to heat the purge gas and/or the adsorbent directly include an electrical coil, a radiator, a heat pump, a solar heater, a furnace, hot water, gas or other fuel, and/or the like.

In some embodiments, as mentioned above, a source of heat for heating a purging gas and/or adsorbent materials of the BOS may be a heat pump. The heat pump may use fluids and compressors in a closed chiller loop of condensation and evaporation, also referred to as a "condenser-evaporator loop", so as to move heat opposite its usual direction, namely removing heat from a lower temperature evaporator region and adding heat to a higher temperature condenser region. In this way, a heat pump can act to continuously cool the ambient environment in a cold region (i.e. the evaporator side or cold side) while heating the ambient in a warmer region (the condenser side or warm side). Viewed as a refrigerator or chiller, it facilitates the cooling of air below its surrounding temperature; viewed as a heater, it delivers heat where needed. In some embodiments, the heat pump may be configured to remove heat from RA and concurrently heat the purge gas (e.g., OA).

In some embodiments, the BOS may also comprise filters configured to capture contaminants contained in air entering the BOS. For example, one or more filters may be used to remove unwanted substances from the mixed air coming in from the mixing chamber and/or the purge air (outside air and/or returning air). In some cases, the filter may not remove all the unwanted substances in the air being filtered (e.g., very small sized particles). The scrubbing of the mixed air may be accomplished via a sorbent configured to remove some or all of the contaminants or unwanted substances contained in the mixed air. For example, the sorbent may include an adsorbent material or a scrubber configured to capture and adsorb the contaminants in the incoming mixed air. The sorbent material may be distributed in the path of the air flowing through the scrubber, or it may be held in one or more locations in replaceable and/or removable inserts or cartridges, to facilitate sorbent replacement when needed. As discussed above the mixed air flowing through the scrubber may at least partially be cleaned by the process of filtration by the one or more filters. Further, the air may be scrubbed of some or all of its remaining contaminants via the adsorption of the contaminants onto the sorbent materials. The cleaned air may then flow back into the mixing chamber via the BOS outlet, from where it can be returned back into the building as a supply air (SA) after being air conditioned through the cooling (or heating) coils of the RTU. In some embodiments, some of this clean air may be returned back into the BOS as part of the mixed air flowing into the BOS. In most embodiments, this portion of cleaned air that returns back into the BOS from the mixing chamber may constitute a small proportion of the total mixed air entering into the BOS. For example, the portion may be less than about 10%, less than about 8%, less than about 5%, less than about 3%, less than about 1%, of the total mixed air, including values and subranges there between. In some embodiments, the portion of cleaned air that may be immediately returned back into the BOS from the mixing chamber may be minimized by judicious use of fans, valves, blowers, etc., and favorable placements of the BOS inlet and outlet (e.g., so as to direct the cleaned air away from the BOS inlet and towards the air-conditioning units of the RTU).

In some embodiments, the scrubber may comprise a regenerable adsorbent material that is configured to adsorb at least one gaseous contaminant contained in the mixed airflow of OA and RA during the adsorption mode of the operation of the scrubber. During the regeneration mode, the regenerable adsorbent material is configured to release contaminants adsorbed onto the adsorbent. Regeneration may be achieved under appropriate conditions where the contaminants that have been captured by the adsorbent material are released and purged, allowing the adsorbent material to regain some or all of its adsorptive properties. For example, regeneration may take place during a temperature-swing cycle where the adsorbent material is heated directly by a heat source (e.g., heater) and/or by a heated purging gas, followed by the purging of the contaminants by the purging gas to be exhausted through an exhaust outlet of the scrubber. The combination of the effects of the heat and the purging air may remove some or all of the contaminants via temperature swing regeneration of the sorbents. Examples of adsorbent materials that can be used as scrubber in the BOS include clays, molecular sieves, zeolites, various forms of silica and alumina, porous silica, porous alumina, various forms of carbon, activated carbon, carbon fibers, carbon particles, titanium oxide, porous polymers, polymer fibers and metal organic frameworks, and/or the like. One or more of these adsorbent materials may be used to scrub contaminants from the mixed air, the contaminants including but not limited to carbon dioxide, volatile organic compounds, sulfur oxides, radon, nitrous oxides and carbon monoxide, and/or the like.

In some embodiments, the BOS may have the capability to perform automatic regeneration of the sorbent material from time to time. In other words, the BOS may be designed to switch automatically between the adsorption mode where contaminants are captured by the adsorbent to the regeneration mode where the adsorbent is regenerated (e.g., via temperature swing regeneration). The determination to switch between the modes may be made based on measurements of the concentration of contaminants in the air being treated (mixed RA and OA, for example) and/or the concentration of adsorbed contaminants on the adsorbents. For example, the BOS may comprise one or more sensors and a controller where the one or more sensors are configured to generate a signal corresponding to the concentration of the at least one gaseous contaminant and/or the presence of the at least one gaseous contaminant, and transmit the signal to the controller system. Upon processing the data from the signal, in some embodiments, the controller (e.g., an electromechanical control system) may instruct the regeneration accessories to initiate the regeneration process. For instance, the controller system may instruct the dampers of the BOS's RAI to not let in any more mixed air into the BOS, while allowing the damper of the BOS's OA inlet to receive outside air that can serve as a purging air. The switching between adsorption and regeneration may take place automatically as well as repeatedly.

In some embodiments, regeneration can be accomplished by heating the sorbent and subsequently purging the sorbent with a stream of air that is exhausted externally. For example, the BOS may be equipped with an exhaust outlet, as well as with a damper that can open and close the outlet, i.e., control flow of the exhaust through the outlet. In some embodiments, one may wish to recycle the purging gas before exhausting the gas out the exhaust outlet. In such embodiments, the BOS may include a closed loop return path that may return used purge gas back to flow through and/or over the adsorbent in the BOS so as to regenerate it repeatedly. In some embodiments, whether to recycle a purging gas or not may be determined by the controller based on purging gas airflow contaminant level measurements obtained from the one or more sensors of the BOS. For example, if the gaseous contaminant level in the exhausted purging gas is below some threshold level, then the exhausted purging gas may be recycled and reused as purging gas airflow by returning it to the adsorbent via the closed loop return path. In some embodiments, the recycled purging gas may also be combined with fresh purging gas (e.g., fresh OA and/or RA). In some embodiments, the closed loop return path may be provided with dampers to control the flow of the exhausted purge gas airflow into and out of the closed loop. For example, one or more dampers within the BOS may be opened so as to facilitate the circulation of a purging gas within the BOS while other dampers (such as those located at BOS inlets and outlets) are closed off to prevent entry and/or escape of the purging gas before the regeneration is complete.

In some embodiments, the BOS can be operably coupled to a heat exchanger that is configured to facilitate thermal communication between the exhaust purge gas and gas coming into the BOS to be used as a fresh purge gas. For example, the heat exchanger may facilitate thermal communication between an exhaust purge gas and OA, RA, and/or a combination thereof. The thermal communication may elevate the temperature of the incoming fresh purge gas, aiding in the regeneration of the adsorbents with little or no heating of the purge gas with additional heating source (hence conserving energy, for example). In some embodiments, the heat exchanger may facilitate thermal communication between the exhaust purge gas and the mixed air in the mixing chamber (for example, the mixed air drawn into the BOS for treatment).

Thermal communication may include any type of heat transfer, such as by contact, convention or conduction, etc. For example, the heat exchanger may comprise a shell and tube configuration, an air coil configuration, a plate configuration, a fin configuration or a counter-flow configuration. In some embodiments, the heat exchange may be facilitated by having conduits carrying the incoming air (e.g., OA, RA, combination thereof, etc.) and the exhaust purge air to run in parallel and in close thermal communication over an extended length of these conduits. Thermal communication can be assisted by increasing a shared surface area of the parallel conduits. In some embodiments, the two conduits may be arranged so that the incoming gas and the exhaust purge gas flow in opposite directions, substantially increasing the heat exchange rate. In some embodiments, the purge gas may be recycled until the efficiency of thermal communication falls below a desired threshold (e.g., the temperature of the exhaust purge gas becomes too low to heat the incoming purge gas in any substantial manner).

FIG. 1 is a schematic illustration of a rooftop unit (RTU) 200 with a bolt-on scrubber (BOS) 100 attached to the RTU's EAI 210. The RTU may comprise a mixing chamber 220 into which return air (RA) returning from the enclosed environment and outside air (OA) entering from outside the enclosed environment may flow. OA may enter the RTU via a pathway through the BOS (for example, if the BOS covers the entire EAI 210 of the RTU) or the OA may enter into the mixing chamber through a separate channel 300. Without the disclosed BOS, a mixture of the RA and the OA may proceed to and be filtered by filter 240 before being conditioned (e.g., heated and/or cooled) by an air conditioning unit 250 (e.g., cooling/heating coils). The treated air may then be supplied back into the enclosed environment as a supply air (SA).

In the presence of the BOS, the RA, the OA or a mixture thereof may flow into the BOS return air inlet (RAI) 110 for scrubbing by the sorbents 160. The flow of the air into the BOS 100 may be facilitated by a suitable means such as a fan 150 that draws the air into the BOS 100 via the BOS RA inlet 110. The air is then scrubbed of some or all of its contaminants by a scrubber containing inserts or cartridges of sorbents 160 before being released back into the mixing chamber via the BOS treated air outlet 120. The BOS may include such sorbent inserts and cartridges along the flow path of the air to be treated (e.g., OA and RA mixture) between the RA inlet 110 and treated air outlet 120 of the BOS. In some embodiments, the air may also be filtered by a filter 190 in the BOS. In some embodiments, the BOS RAI 110 and the TAO 120 face the mixing chamber 220 of the RTU, and are securely attached or otherwise coupled to the RTU EAI 210. In some embodiments, the BOS 100 may not cover the entire RTU EAI 210, leaving a portion of the inlet to be used as a separate channel 300 for allowing in outside air. In some embodiments, there may be a separate channel 300 in addition to an OA pathway through the BOS 100 configured to allow OA flow into the RTU 200. Dampers 310 may be used to control flow of OA into the mixing chamber 220.

In some embodiments, the adsorbent 160 may be regenerated so as to desorb and remove the contaminants captured by the adsorbent 160. The adsorbent may be in the form of inserts or cartridges, and in some cases it may be removable (i.e., replaceable). During regeneration, the adsorbent 160 may be heated directly or indirectly by a heating source 180. In some embodiments, air circulates inside the scrubber in a closed loop, by opening a bypass damper 170, carrying heat from the heating source 180 to the sorbent 160. Accordingly, the adsorbent 160 may be heated so as to facilitate the removal of the contaminants adsorbed onto the adsorbent 160. Upon the heating of the adsorbent 160, in some embodiments, a purge air in the form of OA incoming through the OA inlet 130 may flow through/over the adsorbent 160 and purge or remove the contaminants. In some embodiments, the purge gas may be recycled by opening the bypass damper 170 and closing most or all other dampers in the BOS. In some embodiments, the purge air itself, containing OA and/or RA, may be heated by the heating source 180, and the heated purge air may then heat the adsorbent so as to facilitate the removal of the adsorbed contaminants, i.e., the heated purge air may heat the adsorbent and concurrently purge away the contaminants. Examples of a heating source include an electrical coil, a radiator, a heat pump (using fluids and compressors in a closed chiller loop of condensation and evaporation, for example), a solar heater, a furnace, hot water, gas or other fuel, and/or the like.

The switch between the adsorption mode, where mixed air of OA and RA flows through the adsorbent 160 so that the adsorbent 160 captures contaminants contained within the mixed air, and the regeneration mode, where some or all of the adsorbed contaminants are removed from the adsorbents 160, may be determined based on the measurements of one or more sensors 115 located in the BOS 100 and/or the RTU 200. The sensors may measure, for example, the concentration of contaminants adsorbed onto the adsorbent 160 and/or the amount of contaminants in the mixed air, and transmit (wirelessly or wired, for example) the measurements to controller (not shown) (e.g., microprocessor). The controller may then make a determination and initiate the appropriate mode for the BOS 100. For example, if the contaminant concentration of the RA or mixed air exceeds a certain threshold amount, the controller may activate the dampers of inlets and outlets of the BOS and the RTU to allow the air flow into the BOS 100 and be scrubbed. Similarly, damper 310 may be activated to allow OA into the mixing chamber 220. The controller may accomplish such tasks by transmitting signals wirelessly, for example. Once the adsorbents are regenerated, the exhaust purge gas may be discarded into the outside environment via a BOS exhaust outlet 140. In some embodiments, the exhaust purge gas may be reused for more cycles based on the amount of contaminant concentration contained within (for example, as measured by a sensor) or based on the temperature of the exhaust purge gas (if the temperature of the exhaust purge gas is still high enough to heat up the adsorbent, for example). The recycling of the purge gas may be accomplished via a closed loop return path. An example of such a closed loop return path occurs when dampers located at 110, 120, 130 and 140 are closed and damper 170 is open, facilitating the formation of a closed loop path where purging gas circulates in the BOS using the closed path via the opening through damper 170 and the passageway proximate to exhaust outlet 140. In this manner, a purging gas may be recycled and used again to regenerate the adsorbent in the BOS.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for cleaning air from an enclosed environment, comprising:
   an air handling unit (AHU) including:
   an external air inlet (EAI), and
   a mixing chamber for allowing a mixing of air returned from an interior space (return air) of the enclosed environment with air entering via the EAI; and
   a fastened-on scrubber (BOS) assembly, the BOS assembly comprising:
   a housing;
   an interface arranged on an exterior of the housing and including a return air inlet (RAI) and a treated air outlet (TAO), and
   an adsorbent material configured to treat air received from the RAI,
   wherein:
   the interface is configured to mate with or otherwise couple to the EAI,
   the RAI is configured to receive the return air via the EAI, the return air having traversed through the mixing chamber,
   the adsorbent material is configured to treat the return air received via the RAI by adsorbing at least one contaminant contained therein, and
   the treated air is expelled from the scrubber assembly back to the AHU via the EAI.

2. The system of claim 1, wherein the coupling of the interface to the EAI facilitates a direct flow of the mixed air into the BOS assembly.

3. The system of claim 1, wherein the coupling of the interface to the EAI facilitates a direct flow of the treated air into the mixing chamber of the AHU.

4. The system of claim 1, wherein the coupling of the interface to the EAI supports at least a portion of a weight of the BOS assembly.

5. The assembly of claim 1, where the adsorbent is regenerable.

6. The assembly of claim 1, where the adsorbent is configured to be regenerated in-situ.

7. The assembly of claim 1, wherein the RAI is further configured to receive at least a portion of the return air for use as a purging air for regenerating the regenerable adsorbent material.

8. The assembly of claim 1, further comprising one or more air outlets configured to expel air used to regenerate the absorbent material.

9. The assembly of claim 1, wherein the coupling of the interface to the EAI is facilitated via a mating of respective flanges of the interface and the EAI.

10. The assembly of claim 1, wherein the coupling of the interface to the EAI covers the EAI entirely, and wherein the BOS assembly further comprises a pathway configured to allow flow of outside air into the chamber of the HVAC unit.

11. The assembly of claim 1, wherein the coupling of the interface to the EAI covers the EAI partially, and wherein the system further comprises a separate channel configured to allow a flow of outside air into the chamber via an unobstructed portion of the EAI.

12. The assembly of claim 1, wherein the coupling of the interface to the EAI is configured to minimize a re-entrance of expelled, treated air into the BOS assembly.

13. The assembly of claim 1, wherein the coupling of the interface to the EAI supports at least a substantial portion of a weight of the assembly.

14. The assembly of claim 1, wherein the BOS assembly is configured as a portable unit configured for removable attachment.

15. The assembly of claim 1, further comprising a fan for circulating the return air through the adsorbent material.

16. The assembly of claim 1, wherein the flow of the return air through the RAI, and/or the flow of the treated air through the TAO is/are controlled by a damper.

17. The assembly of claim 1, further comprising a heat source for heating at least one of a purging gas and the adsorbent material, the heat source selected from the group consisting of: a heat pump, a furnace, solar heat, an electrical coil and hot water.

18. The assembly of claim 1, further comprising one or more sensors configured to measure an amount of a contaminant in the at least a portion of the return air received via the RAI and/or the treated air expelled via the EAI.

19. The assembly of claim 18, wherein the measurements obtained from the sensors are used to control an activation and/or deactivation of the BOS assembly.

20. The assembly of claim 1, wherein the adsorbent material is contained within a removable insert or cartridge.

* * * * *